(No Model.)
C. S. WELLS.
EYEGLASSES.
No. 416,528. Patented Dec. 3, 1889.
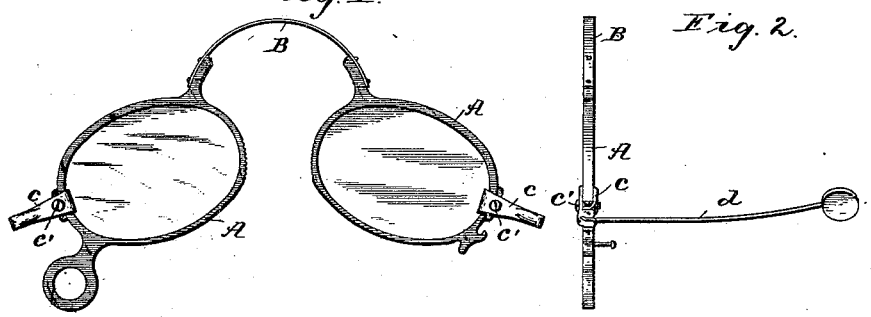
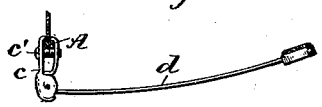
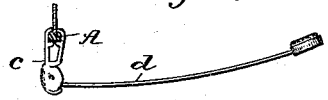
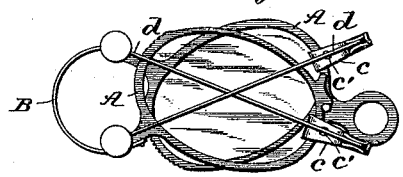
Witnesses
Edwin L. Bradford
Wm. M. Stockbridge
Inventor
Charles S. Wells
By his Attorneys
V. D. Stockbridge & Son.

UNITED STATES PATENT OFFICE.

CHARLES S. WELLS, OF BOSTON, MASSACHUSETTS.

EYEGLASSES.

SPECIFICATION forming part of Letters Patent No. 416,528, dated December 3, 1889.

Application filed June 10, 1889. Serial No. 313,774. (No model.)

*To all whom it may concern:*

Be it known that I, CHARLES S. WELLS, a citizen of the United States, residing at Boston, in the county of Suffolk and Commonwealth of Massachusetts, have invented certain new and useful Improvements in Eyeglasses; and I do hereby declare that the following is a full, clear, and exact description of the invention, such as will enable others skilled in the art to which it appertains to make and use the same.

The invention relates, generally, to eyeglasses, and the object is to provide separate attachments for connection with glasses already made, whereby they may readily be converted from eyeglasses to spectacles, and vice versa, when desired.

Eyeglasses are more compact when closed and are more readily available when suddenly needed than ordinary spectacles; but when used continuously or for a considerable period the pressure on the nose frequently causes inflammation or nervous irritation, causing annoyance and distress. Moreover, they are liable to become displaced, so that the focus of the lens does not correspond with the lens of the eye.

My invention consists, essentially, in the combination of a pair of lens-frames, a spring nose-piece for connecting the frames, clips adjustably connected with the frames, and temple-pieces pivoted to the clips by knuckle-joints.

In the drawings, Figure 1 is a front view showing my glasses open and ready for adjustment upon the wearer. Fig. 2 is a side view of the same. Fig. 3 is a plan or edge view of one of the clips and temple-pieces. Fig. 4 is a similar view of a modified form of clip, and Fig. 5 is a plan showing the glasses in their folded position.

A A are the frames for the lenses, and B is the spring connecting said frames. Adjustably or readily attachably and detachably connected with the frames are clips $c\ c$, each provided with a pair of jaws adapted to grasp the frame and having a socket for the temple pieces or bows $d\ d$. The jaws may be made of spring metal and sprung into and out of connection with the frames, as shown in Fig. 4, or they may be clamped upon the frames by set-screws $c'\ c'$, as shown in Fig. 3.

When it is the purpose to permanently convert old eyeglasses to spectacles, I prefer to use clamping-jaws and set-screws; but for ready conversion from either eyeglasses or spectacles to the other I prefer the spring-clip, although either form of clip will answer all purposes.

The temple pieces or bows $d\ d$ are provided with pads. They are connected with the clips by knuckle-joints and are made short, so that when the glasses are folded together the temple-pieces fold across the glasses and each other and occupy no more lateral space than ordinary eyeglasses.

Having now described my invention, I claim—

1. The combination of a pair of lens-frames, a spring nose-piece for connecting the frames, a pair of clips adjustably connected with the frames, and temple-pieces jointed to the clips, substantially as described.

2. The combination of a pair of lens-frames, a spring nose-piece for connecting the frames, a pair of clips connected with the frames, each consisting of jaws and set-screws, and temple-pieces jointed to the clips, substantially as described.

In testimony whereof I affix my signature in presence of two witnesses.

CHARLES S. WELLS.

Witnesses:
   HENRY L. CARTER,
   WILLIAM BRADFORD.